(12) United States Patent
Remlin et al.

(10) Patent No.: US 8,880,928 B2
(45) Date of Patent: Nov. 4, 2014

(54) MULTIRATE TRANSMISSION SYSTEM AND METHOD FOR PARALLEL INPUT DATA

(75) Inventors: Mark Stephen Remlin, Monroe, CT (US); Michael George Engler, Stamford, CT (US)

(73) Assignee: Thinklogical, LLC, Milford, CT (US)

( * ) Notice: Subject to any disclaimer, the term of this patent is extended or adjusted under 35 U.S.C. 154(b) by 1751 days.

(21) Appl. No.: 12/082,685

(22) Filed: Apr. 11, 2008

(65) Prior Publication Data

US 2009/0259878 A1    Oct. 15, 2009

(51) Int. Cl.
*G06F 5/06* (2006.01)
*G06F 13/42* (2006.01)
*G06F 13/40* (2006.01)

(52) U.S. Cl.
CPC ........ *G06F 13/4278* (2013.01); *G06F 13/4045* (2013.01)
USPC ......................................................... 713/600

(58) Field of Classification Search
CPC .............................. G06F 13/4278; H03M 9/00
USPC ......................................................... 713/600
See application file for complete search history.

(56) References Cited

U.S. PATENT DOCUMENTS

| | | | |
|---|---|---|---|
| 4,558,445 A | 12/1985 | Novick | |
| 4,885,746 A * | 12/1989 | Fukushima et al. | 370/506 |
| 6,094,432 A * | 7/2000 | Jeong | 370/395.7 |
| 6,574,731 B1 | 6/2003 | Coles et al. | |
| 7,356,756 B1 * | 4/2008 | Chan et al. | 714/781 |
| 7,539,209 B2 * | 5/2009 | Pelley | 370/468 |
| 7,684,437 B2 * | 3/2010 | Miller et al. | 370/466 |
| 7,830,924 B2 * | 11/2010 | Kawamura et al. | 370/505 |
| 2003/0091039 A1 | 5/2003 | Ziegler et al. | |
| 2003/0214977 A1 | 11/2003 | Kuo | |

* cited by examiner

*Primary Examiner* — Paul Yanchus, III
*Assistant Examiner* — Eric Chang
(74) *Attorney, Agent, or Firm* — Cantor Colburn LLP

(57) ABSTRACT

A multirate transmission system for transmitting parallel input data from a first location to a second location includes a transmitter portion and a receiver portion. The transmitter portion receives the parallel data, including the information related to a parallel data clock and stores the data in a buffer where it is subsequently read and serialized for transmission on a serial data link to the receiver portion where it is deserialized, including recovery of the parallel data clock in the serialized data stream. The receiver portion stores the parallel data in a buffer where it is read at a data rate corresponding to the parallel data clock of the incoming parallel data. The parallel data at the transmitter portion is associated with generated control characters when parallel data is not read from the buffer associated with the transmitter portion.

25 Claims, 3 Drawing Sheets

MULTIRATE TRANSMISSION SYSTEM AND METHOD FOR PARALLEL INPUT DATA

TECHNICAL FIELD

The present invention relates to data transmission systems, in particular, transmission systems for transferring parallel data emanating from one location to a second, remote location, so as to replicate said parallel data at the remote location.

BACKGROUND OF THE INVENTION

Transmission systems for transferring parallel data from one location to a second, remote location have been used in what are sometimes called video extenders where the data emanating from a video output port on a computer or the like is transferred to a remote location for display on a remote monitor. There has been a need for allowing such parallel data to be transferred regardless of the parallel data clock rate (e.g. associated with different video resolutions and refresh rates) in a manner which is easy to facilitate.

The present invention is directed to such an improved transmission system and is specifically directed to a multirate transmission system, wherein the parallel data clock rate is transferred on the same serial data stream as the serialized parallel data.

SUMMARY OF THE INVENTION

In one embodiment of the present invention, a multirate transmission system sends data from a first location to a second location while being able to adjust to different parallel data clock rates of the incoming parallel data. In such a method and system, the parallel data is received with an associated parallel data clock and is temporarily stored in a buffer. The data is written into the buffer at the rate of the parallel data clock. In this embodiment, the data is read out of the buffer at an output rate so as to prevent the buffer from overflowing or underflowing. Typically, the read clock rate is greater than the write clock rate and thus during periods of time when data is not to be read, control characters are generated for such clock cycles. The overall parallel data and control characters are transferred to a serializer for generating a serial output data stream which can be transmitted to a remote location by various means, such as via an optical medium. The serialized data further contains information related to the parallel data clock rate. At the remote location, the serialized data is deserialized and converted back to parallel form and stored in a buffer. The data in the buffer is read out so as to prevent overflow and underflow. The parallel data is read out of the buffer at a parallel data clock rate based on the parallel data clock rate received in the serial data stream. The output of the buffer thereby corresponds to the parallel data received at the transmitter portion of the multirate transmission system. The multirate transmission system can further encode and decode the parallel data and control characters prior to sending the data on the serial data stream with decoding at the time of deserialization.

An embodiment of the invention is specifically adapted for transmitting video according to the Digital Video Input (DVI) standard.

In an embodiment of the present invention, a particular control character is generated by the transmitter portion to denote the boundaries of the parallel data to be serialized and this control character is used for retrieving the parallel data at the receiver portion of the transmission system.

An embodiment of the multirate transmission system is able to transmit and receive DVI parallel data ranging from 25 MHz to 165 MHz.

An embodiment of the transmission system determines the number of parallel data words (i.e., parallel data clock cycles) received by the transmitter over a predetermined period of time, where the information concerning this count is included in the serialized data sent to the receiver portion of the multirate transmission system so as to determine the parallel data clock rate at the receiver portion.

BRIEF DESCRIPTION OF THE DRAWINGS

For a further understanding of the nature and objects of the present invention, reference should be made to the following detailed description taken in conjunction with the following drawings in which.

DETAILED DESCRIPTION

Figure 1:
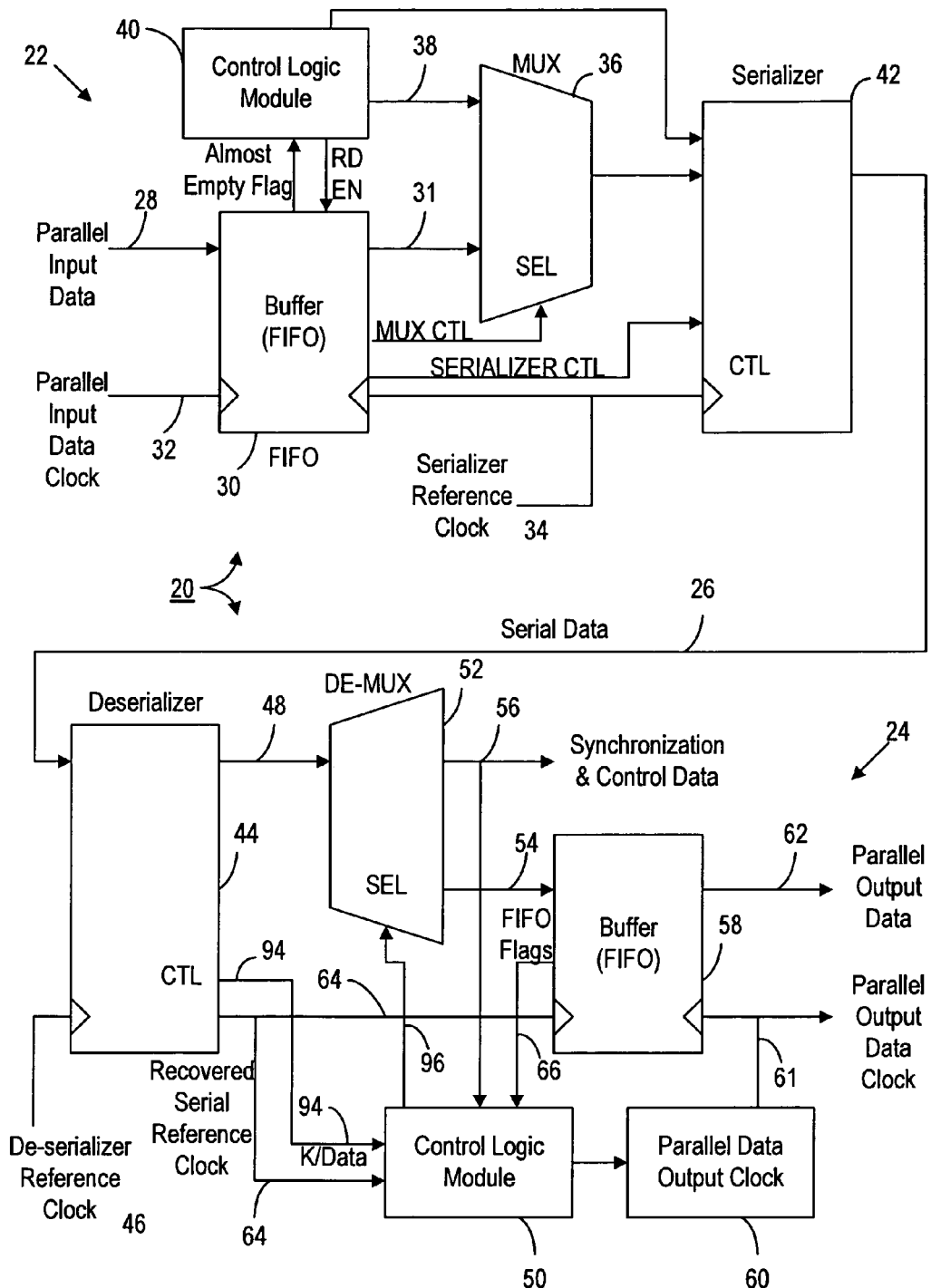
FIG. 1 is an overall simplified block diagram of a multirate transmission system according to the present invention.

As seen in FIG. 1, a multirate transmission system 20 comprises a transmitter portion 22 and a receiver portion 24 linked together by a serial data link 26, such as an optical fiber, coaxial cable, radio link, etc. The transmitter portion 22 receives incoming parallel input data 28 which is temporarily stored in a buffer 30, such as a first in/first out (FIFO) buffer. The buffer can be implemented in various ways, including use of random access memory, registers and the like. The incoming parallel data is clocked into buffer (FIFO) 30 by means of a parallel data clock 32.

Data in the FIFO is read out of the FIFO on bus 31 by means of a serializer reference clock 34 having a frequency greater than the parallel data clock 32. Multiplexer 36 receives synchronization and control data on bus 38 generated by a control module 40 along with parallel data on bus 31 read out of buffer 30. The control module also interfaces with FIFO 30 and serializer 42.

The synchronization and control data are received during periods of time when parallel data is not being read from FIFO 30. Therefore, the overall input data to the multiplexer is being clocked into the multiplexer at the serializer reference clock rate with data being either the parallel data from FIFO 30 or the synchronization and control data from control module 40. Multiplexer 36 determines whether data from bus 31 or 38 is transferred to serializer 42.

Thus, the output from the multiplexer is provided to the serializer 42 under the control of the control module 40 in conjunction with the serializer reference clock 34 so as to generate a serial data stream for presentation on the serial link 26. The serial link can be whatever length is necessary for communicating at a remote end at which the receiver portion 24 of the multirate transmission system 20 is located. The serializer clock rate is selected so as to be able to transmit the serial output data received from the multiplexer 36.

The receiver portion 24 of the multirate transmission system 20 effectively performs the reverse operation of the transmitter portion. Thus, a deserializer 44 under control of a deserializer reference clock 46 receives the incoming serial data stream and converts it into parallel data on output 48 under control of control module 50. The parallel data is received by a demultiplexer 52 which under control of control module 50 generates a first parallel output 54 corresponding to the parallel data 28 received from the transmitter portion 22 and synchronization and control data 56 corresponding to the synchronization and control data 38 generated by the transmitter portion 22. The parallel data 54 is written into a receive buffer 58 via recovered serial reference clock 64. The output from buffer 58 is therefore a parallel output data stream 62 which corresponds to the parallel input data 28 received by the transmitter portion 22. Data is clocked into buffer 58 from demultiplexer 52 based upon a recovered serializer reference clock 64 corresponding to the serializer reference clock 34. The parallel data is read out of buffer 58 based on parallel data clock output 61 of parallel data output clock 60. This parallel data output clock rate in one embodiment is derived from the ratio of the synchronization and control data 38 to the parallel data 31 from buffer 30. It thereby insures that the parallel data read into buffer 58 from demultiplexer 52 is read from the buffer at a rate essentially corresponding to the parallel data clock rate 32 associated with the parallel data 28 received by transmitter portion 22. Minor adjustments to the rate of the parallel data output clock 60 is made by means of control module 50 in association with flags 66 from buffer 58. It can also be determined by counting the number of parallel data clock cycles within a predetermined length of time, such as 1 millisecond.

The overall result is that the parallel output data 62 and parallel data output clock correspond essentially to the parallel input data 28 and parallel data input clock 32 with minimal jitter. Furthermore, a separate reference for purposes of establishing the rate of the parallel data output clock is eliminated since the rate of this clock is determined by the incoming serial data to the deserializer 44 as will be explained more fully below.

Figure 2:
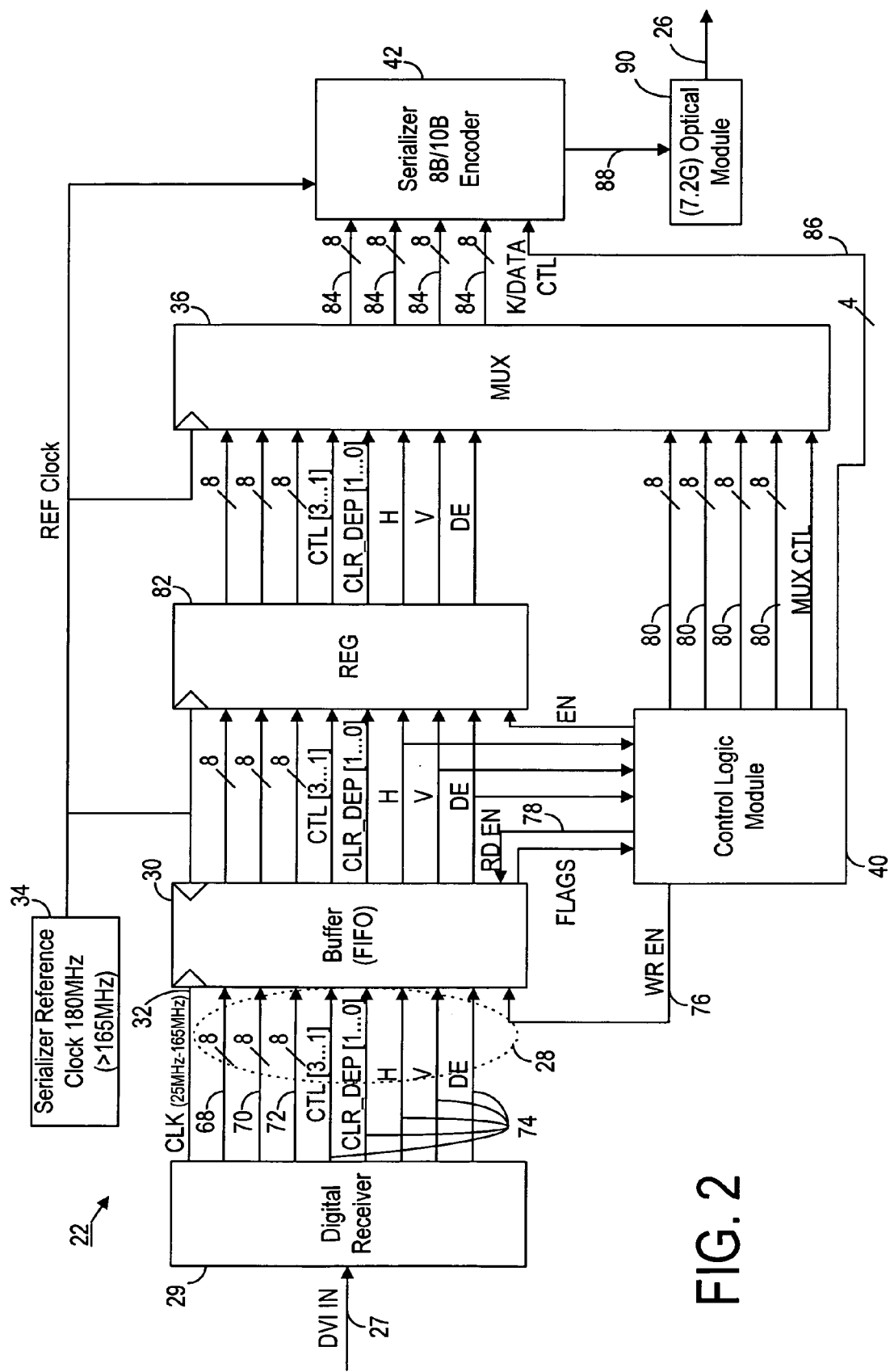
FIG. 2 is a block diagram of the transmission of the transmitter portion of the multirate transmission system.

FIG. 2 is a detailed block diagram of the transmitter portion 22 of the multirate transmission system 20. It is specifically shown for an embodiment of the present invention for receipt of video data 27 corresponding to the Digital Video Input (DVI) standard. This data uses Transition Minimized Differential Signaling (TDMS) and is actually a type of high speed serial data. This data is converted into parallel data 28 and clock 32 by a digital receiver 29. As seen there, the parallel data can comprise a plurality if eight bit bytes 68, 70, and 72 and associated control information designated generally as 74, including, for example, horizontal synchronization information, vertical synchronization information, and data enable (DE) information, as well as control information associated with the parallel data. The parallel input data clock 32 can, for the DVI standard, range from 25 MHz to 165 MHz. This information is clocked into buffer 30 via clock 32. It is read out of buffer 30 via serializer reference clock 34. Of course, any other type of data can be received at its own data clock rate. It should be noted that types of data received by the multirate transmission system 20 can therefore be anything as long as the data can be converted into parallel data 28 with associated clock data 32. Thus, the digital receiver 29 and digital transmitter 102 shown respectively in FIGS. 2 and 3 associated with the embodiment for transmitting and receiving data according to the DVI standard, need not form part of the multirate transmission system.

As noted, in this particular embodiment, the serializer reference clock has a data rate of 180 MHz (that is, greater than the maximum data rate of the incoming DVI data). The parallel data 28 is clocked into buffer 30 based upon the parallel data clock signal 32 in conjunction with the write enable signal 76 from control logic module 40. Buffer 30 has independent read clock capability; that is, the read clock can be different from the write clock and thus data stored in buffer 30 can be read from it by means of the serializer reference clock 34 which operates at a higher clock rate than the clock associated with the incoming parallel data. Due to the higher clock rate of the serializer reference clock, the buffer 30 is only read when enabled to do so by the read enable signal 78 from control logic module 40, in an arrangement that insures that there is neither underflow or overflow of the data within buffer 30. For those periods of time in which data is not being read from the buffer 30, the serializer reference clock 34 in conjunction with control module 40 generates control characters on data busses 80 so that these control characters are received by multiplexer 36. Control module 40 can generate information related to parallel data clock 32 for transmission by counting the number of parallel data clock cycles for a predetermined length of time, such as 1 millisecond.

Serializer 42 is connected to output busses 84 from multiplexer 36 under the control of K/data control bus 86 from control logic module 40. K/data control bus 86 informs serializer 42 whether the data from multiplexer 36 corresponds to the parallel data 28 or to the control characters generated by control logic module 40 as received by multiplexer 36 via data busses 80.

In this embodiment of the present invention, serializer 42 also encodes the received parallel data, including the control characters via an encoding scheme, such as the 8B/10B encoding scheme well-known in the art. Other encoding/decoding schemes can, of course, be used. The resulting encoded serialized output is presented on output line 88 for presentation to optical module 90 for generating a serialized output on serial data medium 26. In this particular embodiment, the optical module has a 7.2 GHz data rate so as to correspond to the maximum parallel data rate of the serializer reference clock 34 times the number of parallel data bits received by serializer 42 which, in this particular embodiment, is 40 bits. Of course, other means for transmitting a serial output data stream are possible, including the use of coaxial cable or a radio frequency output module instead of the optical module 30. Such alternative means for generating an outgoing serial data stream for long distance transmission are well-known in the art.

Figure 3:
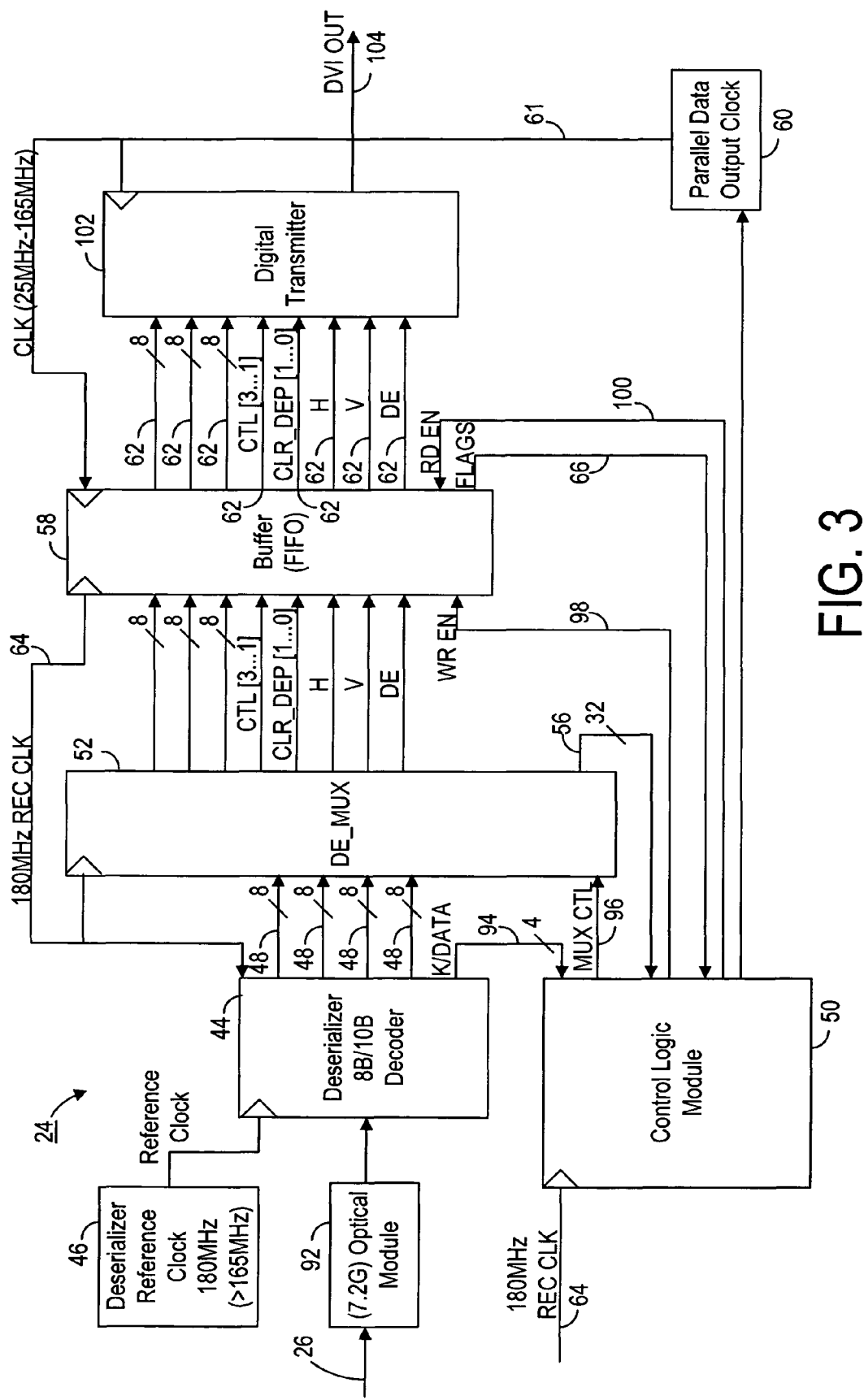
FIG. 3 is a block diagram of the receiver portion of the multirate transmission system.

FIG. 3 is a detailed block diagram of the receiver portion 24 of the multirate transmission system and therefore includes a corresponding optical module 92 for receipt of the serial data stream via serial media 26. The deserializer reference clock 46 has a nominal frequency corresponding to the serializer reference clock 34 which, in this particular embodiment, is 180 MHz. Deserializer 44 in this particular embodiment therefore not only deserializes the incoming data from the optical module 32, but also decodes the data, which in this particular embodiment is via the 8B/10B decoding scheme.

Again, the data deserialized by deserializer 44 is output on parallel output data busses 48 correspond to the incoming DVI data and control information, while the control characters received for those periods of time when the DVI data is not present are transferred to control module 50 via bus 56 under control of the K/data bus 94.

Control module 50 via the multiplexer (MUX) control line 96 and the recovered serializer clock 64, control multiplexer 52 with respect to writing of the parallel DVI data into the demultiplexer. The output of the demultiplexer with respect to the parallel data (DVI data 28) is transferred to the buffer 58, such as a FIFO type buffer, which is also under the control of the control logic module 50 via the write enable (WE) signal 98.

The FIFO output flags 66 are transferred to the control logic module 50 to enable the timing of the read enable (RE) signal 100 which, in conjunction with the parallel data output clock signal 61 of the parallel data output clock 60, insures that the data read from the FIFO buffer 58 is at a data rate corresponding to the incoming data rate of the parallel data 28, and further to insure that the buffer does not underflow or overflow. The rate of the parallel data output clock signal 61 is adjusted by comparison of this clock rate to the information related to the parallel data clock rate as transmitted in the serial data stream.

The output 62 of the FIFO buffer 58 and the parallel data clock output signal 61 are transferred to a DVI digital transmitter 102 for generating a DVI TMDS data output 104 which corresponds to the DVI input data 27 received by digital receiver 29 at the front end of transmitter portion 22 of multirate transmission system 20.

The overall result of the multirate transmission system is therefore to generate a parallel data output at the receiver portion which corresponds to the parallel data input received by the transmitter portion. The present invention achieves this objective with recapturing of the data rate of the parallel input data without the need for any separate transmission of clocking information aside from the information transmitted in the serial data stream between the transmitter portion and the receiver portion. By means of the control logic module 50 in association with the parallel data output clock 60, minor adjustments in the read rate of the parallel data from buffer 58 are made so as to minimize the jitter associated with the parallel data output clock rate 61 corresponding to the input rate of the parallel data arriving at the transmitter portion of the multirate transmission system. This minimizing of jitter is essential for some applications, including DVI applications.

In a particular example, the parallel input data clock rate is derivable from the received data stream to the deserializer 44 by the control module comparing the percentage of parallel data to the percentage of control characters received via the deserializer. Thus, for example, if a 180 MHz clock signal is used and if the received parallel data occupies 50% of the deserialized data and the control characters represent the remaining 50% of the deserialized data, then the parallel data clock rate has a frequency of 0.5×180 MHz or 90 MHz.

The overall result is a multirate transmission system which can be used with incoming parallel input data that can range over a wide frequency range for any particular application. If the input frequency of the parallel input data varies, resynchronization of the multirate transmission system is easily obtainable since the information necessary for recovering the input parallel data is contained within the serial data stream received by the deserializer at the receiver portion.

For the embodiment of the present invention where DVI data is transmitted from the transmitter portion to the receiver portion, one method of measuring the parallel data clock is by counting the number of parallel data clock cycles during a one millisecond time period. This function is performed by controller 40. A 24 bit value is read by a local central processing unit (CPU) of the control module and transmitted by the serializer and the optical link 26 during a control phase of the transmission.

For the receiver portion, the value from the transmitter portion is read and stored in memory of control module 50 for comparison to the rate of the parallel data output clock 60. As in the transmitter portion, this value can be determined by counting the number of parallel data words in a one millisecond period.

The two values for the receiver and transmitter are compared and the parallel data output clock is adjusted using a procedure as set forth in Table 1 below. The adjustments can be made during every vertical synchronization period of video data, which is usually at a frequency of 60 Hz.

The underlying concept of this methodology is that if the receiver clock is faster than the transmitter clock, then the CPU at the receiver portion slows down the clock generator, (parallel data output clock), and conversely, if the receiver clock is too slow, the control module speeds up the clock generator.

Enhancements can be made to check if the values are in range, as well as a procedure to adjust the clock generator in non-linear steps to achieve faster matching than otherwise possible. This is done by use of a COURSE and MEDIUM adjustment phases (see Table 1).

A FINE phase uses the FIFO data count from buffer 58 as an indication of how fast or slow the data is being read out. For nominal operation, the FIFO data word should be approximately one half of the FIFO size in order to allow for "rubberbanding" of the output data. The FIFO data word is continually monitored and the clock is continually adjusted to compensate for data bursting and source clock dithering. When two clock counts cannot be adjusted within a normal range, the procedure reverts back to either COURSE or MEDIUM mode in order to readjust the regenerated clock signal. This procedure can be used to detect when a screen resolution has changed in the incoming DVI video data.

Another embodiment of the present invention can receive data corresponding to the Universal Serial Bus standard, including the USB 2.0 standard, for purposes of transmitting keyboard, mouse and audio information or any other information that supports the USB standard.

The serial link and associated optical transmitter and receiver can be implemented according to the XAUI standard for connecting 10 Gigabit Ethernet (10 GbE) ports to each other. It can also be used for 10 G XFP (small form factor pluggable) hot-swappable protocol-independent optical transceiver applications, including those for DVI dual link applications.

TABLE 1

```
Pseudo code control algorithm:
//**********************************************************************
//this routine is called on every vertical sync. (approx 16 ms for 60 Hz)
//**********************************************************************
Get a new TX and RX count;      // new counts are generated every millisecond
If (COARSE ADJUST)
    {
    If (the TX and RX count are in a valid range)
        If (this is the first time though COARSE)
            {
            Calculate the initial value to send to the clock generator
using the TX count;
            Send the value to the clock generator;
            }
        Else If (not first time through COARSE)
```

TABLE 1-continued

```
            {
            Calculate the difference in the TX and RX clock counts;
            if (difference > 30)
                    {
                        if (count_tx > count_rx)
                            {
                            Calculate the value to send to the clock
generator;
                                using the TX count +x;
                                Send the value to the clock generator;
                            }
                        else if (count_tx < count_rx)
                            {
                            Calculate the value to send to the clock
generator using the TX count – x
                                Send the value to the clock generator;
                            }
                        Else            // we are = go to medium
                            {
                            Set the flags to go to medium next time
through
                            }
                    }// end if (!first_time_flag)
                }// end if(do_range)
                    }// end if(coarse_adjust)
// --------------------
// medium adjust
// --------------------
If (Medium Adjust)
    {
        If ( TX and RX count are in a valid range)
            {
            Calculate the difference between the TX and RX counts;
            if (difference > 50) // out of adjustment range
                    {
                    Set flags to enter coarse adjust next time;
                    exit;
                    }
            else if ( difference > 10)
                    medium_step_value = 0x6000;
            else if (difference > 5)
                    medium_step_value = 0x5000;
            else if (difference > 2)
                    medium_step_value = 0x4000;
            else if (difference > 1)
                    medium_step_value = 0x3000;
            else
                    medium_step_value = 0x2000;
            //
            // TX & RX count is within 2 counts
            //
            if (fpga_count_tx > fpga_count_rx)
                    {
                    value += (u32)medium_step_value;          // speed up
                    Send the value to the clock generator;
                    }
            else if (fpga_count_tx < fpga_count_rx)
                    {
                    value -= (u32)medium_step_value;          // slow down
                    Send the value to the clock generator
                    }
            else   // we are equal; go to fine adjust
                    {
                    Set flags for fine adjust next time through;
                    }
                }
        }
// --------------------
//      fine adjust
// --------------------
if (fine_adjust)
        {
        if ( fifo_count > FIFO_UPPER_COUNT)
                {
                // 9910 too slow: speed it up
                if (count_rx <= count_tx) // allow to speed up only if rx <= tx
                    {
                    value += FINE_STEP_VALUE;
                    Send the value to the clock generator;
                    }
```

TABLE 1-continued

```
        }
        else if ( fifo_count < FIFO_LOWER_COUNT)
        {
            // 9910 too fast: slow it down
            if (count_rx >= count_tx)        // allow to slow down only if rx >= tx
            {
                value -= FINE_STEP_VALUE;   // step value
                Send the value to the clock generator;
            }
        }// end else if
        //
        // CHECK TX & RX COUNT FOR RESOLUTION CHANGE
        //
        if ( count_tx and count_rx are in a valid range )
        {
            Calculate the difference in the TX and RX clock counts;
            if (difference > 10)             // if more 10 counts off, we changed resolutions
            {
                Set flags to go into Coarse adjust next time through;
                first_time_flag = 0;
            }
            else if ( difference > 2)        // we fine tuned out of adjustment range
            {
                Set flags to go into medium mode next time through;
            }
        }// end if ( )
    }// end if (fine_adjust)
}
```

Components

The buffer, register, multiplexer, serializer and control logic module of transmitter portion 22 can be fabricated from a field programmable gate array. Optical modules 90 and 92 can be a small form factor pluggable (SFP) optical transceiver.

For the receiver portion 24, the deserializer, multiplexer, buffer, and control logic module can also be fabricated from field programmable gate arrays. Parallel data output clock 60 can be fabricated from Analog Device part no. AD9910, having a clock range of from 0 to 400 MHz in 0.25 Hz increments. The control modules can also be fabricated from control processing units with associated memory for program control (including implementation of the parallel data clock control information). Digital receiver 29 can be fabricated from a receiver manufactured by Silicon Image, part number 7171 and digital transmitter 102 can be fabricated from a transmitter manufactured by Silicon Image, part number 7170.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method of sending and receiving parallel input data comprising:
    temporarily storing said parallel input data in a first buffer based on a received parallel data clock that can range from a minimum to a maximum value;
    based on a serializer reference clock having a clock frequency that is higher than the maximum clock frequency of the parallel data clock:
        reading said parallel input data from said first buffer at a rate that prevents overflow and underflow of said first buffer, and
        generating information related to said parallel data clock and generating control characters when parallel input data is not read from said first buffer;
    serializing said read parallel data, said information related to said parallel data clock, and said control characters into a serial data stream;
    transmitting said serialized data;
    receiving and deserializing said serialized data into said parallel input data, information related to said parallel data clock, and control characters;
    determining at least an approximation of said parallel data clock from the information related to said parallel data clock;
    storing said deserialized data in parallel form in a second buffer based on said determined parallel data clock; and
    reading said parallel data from said second buffer at said approximation of said parallel data clock so as to prevent overflow and underflow of said second buffer.

2. The method of claim 1, wherein the information related to said parallel data clock is based on the ratio of said control characters to said parallel input data.

3. The method of claim 1, wherein information related to said parallel data clock is based on a number of parallel data words received during a predetermined length of time.

4. The method of claim 3, wherein the determining of at least an approximation of the parallel data clock is performed by retrieving said number of parallel data words received during a predetermined length of time from the deserialized data, and comparing a derived clock frequency to a locally generated clock, and adjusting said locally generated clock based on said comparison.

5. The method of claim 4, wherein the adjusting is performed in adjustable increments based on a size of said comparison.

6. The method of claim 1, further comprising:
encoding said parallel input data, said information related to said parallel data clock, and control characters based on an encoding scheme, serializing said encoded parallel data, said information related to said parallel data clock, and said encoded control characters, and further comprising deserializing said encoded parallel data, said information related to said parallel data clock, and said encoded control characters and decoding said deserialized encoded parallel data, said information related to said parallel data clock, and said deserialized encoded control characters based on a decoding scheme corresponding to said encoding scheme.

7. The method of claim 1, wherein at least some of the control characters are used for determining the location of the parallel input data relative to other deserialized data.

8. The method of claim 1, wherein information related to said parallel data clock is based on a number of parallel data words received during a predetermined length of time.

9. An apparatus for sending parallel input data comprising:
a buffer configured to store said parallel input data based on a received parallel data clock that can range from a minimum to a maximum value;
a control module configured to control, based on a serializer reference clock having a clock frequency that is higher than the maximum clock frequency of the parallel data clock:
reading said parallel input data from the buffer at a rate that prevents overflow and underflow of said buffer, and
generating information related to said parallel data clock and generating control characters when parallel input data is not read from the buffer;
a multiplexer configured to store the read parallel input data, the information related to said parallel data clock and said control characters; and
a serializer, in cooperative engagement with said multiplexer, configured to convert the read parallel input data, the information related to said parallel data clock and the control characters into a serial data stream for transmission.

10. The apparatus of claim 9, wherein said information related to said parallel data clock is determined by counting a number of parallel data clock cycles received by the buffer over a predetermined length of time and transferring this information to the serializer for transmission in the serial data stream.

11. The apparatus of claim 10, wherein the serializer encodes the parallel input data, the information related to said parallel data clock, and the control characters prior to serializing said parallel input data, said information related to said parallel data clock, and said control characters.

12. The apparatus of claim 11, wherein the encoding scheme is 8B/10B.

13. The apparatus of claim 9, wherein the information related to said parallel data clock is determined based on a ratio of the parallel input data to the control characters.

14. The apparatus of claim 9, further comprising an optical transmission module.

15. An apparatus for receiving serial data comprising:
a deserializer having a clock frequency controlled by a serializer reference clock, configured to receive said serial data containing parallel input data, information related to a parallel data clock of the parallel input data having a clock frequency that can range from a maximum clock frequency to a minimum clock frequency, and control characters, and configured to convert the received serial data into said parallel input data, information related to said parallel data clock, and control characters, wherein the serializer reference clock has a clock frequency that is higher than the maximum clock frequency of the parallel input data;
a demultiplexer configured to receive the parallel input data and information related to said parallel data clock from the deserializer;
a buffer configured to store the parallel input data from the demultiplexer; and
a control module configured to receive control characters from the deserializer and the information related to said parallel data clock, configured to control the transfer of parallel input data to the demultiplexer, configured to control the writing of parallel input data to the buffer, and configured to control the determination of at least an approximation of said parallel data clock based on the information related to said parallel data clock so that the parallel input data read from the buffer is received at the determined parallel data clock corresponding to the parallel data clock of the parallel input data.

16. The apparatus of claim 15, wherein the control module is configured to determine at least an approximation of the parallel data clock from the incoming deserialized data by comparing the proportion of parallel input data to control characters in combination with the deserializer reference clock.

17. The apparatus of claim 15, wherein the control module determines at least an approximation of the parallel data clock by retrieving data in the serial data stream corresponding to a number of clock cycles transmitted during a predetermined length of time as transmitted in the serial data.

18. The apparatus of claim 17, wherein the control module repetitively adjusts the determined parallel data clock based upon comparing said retrieved number in the serial data and the clock rate of a locally generated parallel data clock.

19. The apparatus of claim 18, wherein the control module is configured so that said repetitive adjustments are in adjustable increments based on the size of said comparison.

20. An apparatus for sending and receiving parallel input data comprising:
a transmitter portion having:
a first buffer configured to restore said parallel input data based on a received parallel data clock that can range from a minimum to a maximum value;
a control module configured to control, based on a serializer reference clock having a clock frequency that is higher than the maximum clock frequency of the parallel data clock:

reading of said parallel data from the buffer at a rate that prevents overflow and underflow of said buffer, and generating information related to said parallel data clock and generating control characters when data is not read from the first buffer;

a multiplexer configured to store the information related to said parallel data clock and said control characters;

a serializer in cooperative engagement with said multiplexer, configured to convert the parallel data, the information related to said parallel data clock, and the control characters into serial data for transmission; and a serial data transmitter configured to transmit said serial data; and a receiver portion having:

a deserializer having a clock frequency controlled by a serializer reference clock configured to receive said serial data and configured to convert the received serial data into said parallel input data, information related to said parallel data clock, and control characters, wherein the serializer reference clock has a clock frequency that is higher than the maximum clock frequency of the parallel input data into parallel data, control characters and information related to said parallel data clock;

a demultiplexer configured to receive the parallel input data and information related to said parallel data clock from the deserializer;

a second buffer configured to store the parallel input data from the demultiplexer; and a control module configured to receive the control characters from the deserializer and the information related to said parallel data clock, configured to control the transfer of parallel input data to the demultiplexer, configured to control the writing of parallel input data to the second buffer, and configured to control the determination of at least an approximation of said parallel data clock based on said information related to said parallel data clock so that the parallel input data read from the second buffer is read at the determined parallel data clock corresponding to the parallel data clock of the parallel input data.

21. The apparatus of claim 20, wherein said information related to said parallel data clock is determined by counting a number of parallel data clock cycles received by the buffer over a predetermined length of time and transferring this information to the serializer for transmission in the serial data stream.

22. The apparatus of claim 21, wherein the serializer encodes the parallel input data, the information related to said parallel data clock, and the control characters prior to serializing said parallel input data, said information related to said parallel data clock, and said control characters.

23. The apparatus of claim 22, wherein the encoding scheme is 8B/10B.

24. The apparatus of claim 20, wherein the information related to said parallel data clock is determined based on a ratio of the parallel input data to control characters.

25. The apparatus of claim 20, wherein the serial data transmitter and said serial data receiver are respectively an optical transmitter and optical receiver.

* * * * *